3,290,402
PROCESS FOR PREPARATION OF POLYETHYL-BIPHENYL BY ALKYLATION OF BIPHENYL

George Suld, Springfield, Pa., assignor to Sun Oil Company, Philadelphia, Pa., a corporation of New Jersey
No Drawing. Filed Nov. 27, 1963, Ser. No. 326,395
11 Claims. (Cl. 260—671)

This invention relates to a method of preparing polyethylbiphenyls by the catalytic alkylation of biphenyl with ethylene. The method is characterized in that the polyethylbiphenyl product obtained therefrom has a specific number of ethyl groups. By way of example the method can be used to prepare polyethylbiphenyl having 5–6 ethyl groups and which is essentially free of higher or lower ethylbiphenyls. As another example the method can be used to prepare polyethylbiphenyl having 7–10 ethyl groups and which is essentially free of lower ethylbiphenyls. Hepta and higher ethylbiphenyls are useful as cable oils and calender mill oils while penta and hexaethylbiphenyls can be converted by hydrogenation to non-smoking fuels which leave essentially no carbon residue upon burning.

It is known to alkylate biphenyl with ethylene, ethyl chloride, etc. in the presence of a Friedel-Crafts catalyst such as aluminum chloride. Such a procedure is described in, for example, U.S. Patent 2,172,391 issued to H. J. Krase. This and other known biphenyl alkylation processes have one or more disadvantages. Many of them do not produce alkylbiphenyls having more than 4 or 5 alkyl groups. Those that do are not very selective in that the product usually contains almost all of the alkylated biphenyls lower than the ones desired and usually contains at least some of the alkylated biphenyls higher than the ones desired. I have now discovered a highly selective biphenyl alkylation process, i.e., and alkylation process which has a very narrow product distribution. In one embodiment my process produces polyethylbiphenyl containing only 5–6 ethyl groups while in another embodiment my process produces polyethylbiphenyl containing only 7–10 ethyl groups.

According to the invention biphenyl is selectively alkylated by contacting the biphenyl with ethylene in the presence of specific amounts of HF and $BF_3$ as catalyst and under certain conditions of temperature and ethylene pressure. The alkylation reaction which occurs upon such contacting is allowed to continue until no further substantial ethylene consumption occurs, at which point the reaction product will contain either polyethylbiphenyl having only 5–6 ethyl groups or polyethylbiphenyl having only 7–10 ethyl groups, the specific product distribution depending, inter alia, on the amount of catalyst employed. In most cases, when ethylene consumption ceases all the biphenyl is consumed, i.e., the reaction is complete, although in some cases a very small amount of unreacted biphenyl remains. Depending upon the polyethylbiphenyl product desired the alkylation sometimes has to be carried out in the absence of a solvent. Although it is not known with certainty it is believed that the effective alkylating agent in the reaction is a complex formed by reaction of the ethylene with HF and $BF_3$. The polyethylbiphenyl reaction product exists as a complex with HF and $BF_3$ which can be decomposed by, for example, heating, treatment with water, etc.

The product distribution will depend upon the reaction conditions. In order to obtain polyethylbiphenyl having 5–6 ethyl groups and being essentially free of higher and lower ethylated biphenyls the amount of catalyst employed should be 0.05–1.0 mole of HF per mole of biphenyl and 0.01–0.25 mole of $BF_3$ per mole of biphenyl. Preferably the amount of HF is 0.1–0.8 mole per mole of biphenyl and the amount of $BF_3$ is 0.05–0.2 mole per mole of biphenyl. When the amount of catalyst is not within the ranges specified the reaction product will contain appreciable quantities of polyethylbiphenyl having 1–4 ethyl groups and/or more than 6 ethyl groups in addition to the desired polyethylbiphenyl having only 5–6 ethyl groups.

It has also been found that to obtain polyethylbiphenyl having only 5–6 ethyl groups the alkylation reaction must be carried out in the absence of a solvent. While the reason therefore is not known with certainty it has nevertheless been found that when a solvent is used a considerably wider product distribution is obtained. This requirement is surprising since, as is pointed out subsequently, in preparing polyethylbiphenyl having 7–10 ethyl groups by the invention the use of a solvent has relatively little effect on the type of product obtained.

In preparing polyethylbiphenyl having 5–6 ethyl groups the contact of ethylene with biphenyl should be at a temperature sufficient to initiate an exothermic reaction. The alkylation of biphenyl with ethylene is exothermic and once the reaction beings heat is generated and a self-sustaining alkylation reaction occurs. The reaction will continue until most or all of the biphenyl is converted to polyethylbiphenyl containing only 5–6 ethyl groups at which point the reaction inherently stops. This inherent end of the reaction is evidenced by an end of ethylene consumption. The temperature required to initiate the exothermic reaction is about room temperature in most cases although with very low amounts of HF and $BF_3$ within the ranges specified it is sometimes necessary to heat the biphenyl starting material to above its melting point (78° C.) to initiate the reaction. In most cases, however, the reaction can be and preferably is initiated at 20°–50° C.

As the reaction proceeds the temperature of the reaction mass rises because of the exothermic nature of the reaction. The maximum temperature reached will depend upon such factors as the amount of each reactant, the surface area of the reaction vessel, etc. In most cases the maximum temperature will not exceed 300° C. If desired, cooling means can be employed to reduce the temperature rise of the reaction mass although care must obviously be exercised to avoid cooling the reaction mass to such an extent that the reaction stops altogether. In other words the inherent ending of the reaction as described above should be allowed to occur. Preferably the reaction is carried out in such a manner that the maximum temperature does not exceed 300° C.

Because of the exothermic nature of the reaction it should not be initiated at a temperature higher than 100° C. Above 100° C. the reaction occurs extremely rapidly and the temperature of the reaction mass rises very rapidly to an extremely high level which is often sufficient to cause thermal degradation of some of the polyethylbiphenyl product.

The reaction should be conducted at an ethylene pressure of at least 200 p.s.i.g. In general higher ethylene pressures result in higher yields of product. Preferably the ethylene pressure is at least 350 p.s.i.g., e.g., 350–5000 p.s.ig., more preferably at least 500 p.s.i.g., e.g., 500–5000 p.s.i.g.

Once the reaction has begun it should be allowed to continue until there is no further substantial ethylene consumption. This will normally require about 10–120 minutes although the exact time will vary depending upon the amount of HF and $BF_3$, the ethylene pressure, etc. The reaction should, however, be continued until there is substantially no further ethylene consumption for at this point all the polyethylbiphenyl product in the reaction mixture will contain 5–6 ethyl groups. This narrow product distribution is, of course, surprising. One would expect to obtain a reaction product containing most of the ten ethylated biphenyls having the formula $R(C_2H_5)_n$ where R is a biphenyl nucleus and $n$ equals 1–10.

The reaction can be conducted in any convenient manner and in conventional equipment. By way of example, the solid biphenyl is charged to an autoclave type reactor at room temperature. The HF is then added followed by the $BF_3$ after which the autoclave is pressured with ethylene. Preferably the autoclave is equipped with agitation means so that intimate contact of the catalyst and the reactants can be achieved. If ethylene consumption does not begin immediately the temperature of the reactor is raised slightly until it does. As the reaction proceeds the ethylene pressure is maintained within the ranges specified. When further consumption of ethylene ceases the reaction is complete.

The reaction product mixture contains polyethylbiphenyl having 5–6 ethyl groups, a small portion of which is complexed with the HF—$BF_3$ catalyst. The reaction product is essentially free of polyethylbiphenyl containing more than 6 or less than 5 ethyl groups. Infrequently, some unreacted biphenyl may be present in the reaction product. The polyethylbiphenyl containing 5–6 ethyl groups can be recovered in any convenient manner. Preferably the reaction product is quenched in ice. This decomposes the complex and results in a two-phase system, an aqueous acid phase, and a lighter hydrocarbon phase containing the desired polyethylbiphenyl. The latter is then separated by, say, decanting. The hydrocarbon phase is quite viscous and separation of this phase from the acid phase is facilitated by preliminarily diluting the hydrocarbon phase with a solvent such as pentane, hexane, etc. Any traces of acid in the separated hydrocarbon phase can be removed by washing same with aqueous NaOH, after which any traces of water in the hydrocarbon phase can be removed by drying over a desiccant such as anhydrous $K_2CO_3$. If the hydrocarbon phase was diluted with a solvent the latter can then be removed by, say, distillation. If the polyethylbiphenyl reaction product contains any unreacted biphenyl it can also be removed by distillation, preferably under vacuum.

In preparing polyethylbiphenyl containing solely 7–10 ethyl groups the procedure is, for the most part, substantially the same as described above, the major difference being the amount of catalyst employed. In preparing hepta and higher polyethylbiphenyl the amounts of HF and $BF_3$ should be at least 0.5 mole of each per mole of biphenyl. Preferably at least 0.8 mole of each per mole of biphenyl is used. More preferably the amount of HF is 1–100 moles per mole of biphenyl and the amount of $BF_3$ is 1–10 moles per mole of biphenyl.

It has also been found that in preparing polyethyl-biphenyl containing 7–10 ethyl groups the reaction can be carried out in the presence of a solvent for the biphenyl without any significant effect on the product distribution. The use of a solvent is actually preferred since it facilitates efficient contact of the reactants with each other and with the catalyst. Suitable solvents include cyclohexane, cycloheptane, hexane, etc. Aromatic solvents should be avoided since they would tend to be alkylated themselves. In other words, the solvent should be inert. The conditions of temperature and ethylene pressure should be as described for the preparation of polyethylbiphenyl having 5–6 ethyl groups. The reaction producing hepta and higher ethylated biphenyls is also usually initiated at about room temperature. The time required for completion of the alkylation reaction producing hepta and higher ethylated biphenyls is generally somewhat longer than previously described in connection with penta and hexaethylbiphenyl. In any event, as described previously, the reaction should be allowed to continue until there is no further substantial uptake of ethylene. Normally the reaction is complete in 30 minutes to 6 hours. The polyethylbiphenyl containing 7–10 ethyl groups can be recovered in the same manner as previously described.

The following examples illustrate the invention more specifically.

*Example I*

To a shaking type 150 ml. stainless steel bomb at 5° C. is charged 0.25 mole biphenyl, 0.275 mole HF, and 0.25 mole $BF_3$. The mole ratio of HF and $BF_3$ to biphenyl is 1.1:1 and 1:1 respectively. The bomb contains no heating or cooling means. The bomb is shaken and ethylene at room temperature is charged thereto until the ethylene pressure in the bomb is about 600 p.s.i.g. The temperature in the bomb begins to rise and reaches about 60° C. about 7 minutes after the initial ethylene addition. As ethylene is consumed additional ethylene is charged to the bomb in order to maintain the ethylene pressure at about 600 p.s.i.g. The reaction temperature reaches a maximum of 98° C. 136 minutes after initial ethylene addition. Ethylene uptake stops 180 minutes after initial ethylene addition at which time the reaction temperature is 80° C. The ethylene supply is shut off, the bomb is opened, and the contents thereof are quenched in ice. A two-layer system results, an upper hydrocarbon layer and a lower acid layer. The hydrocarbon layer is very viscous and is diluted with 200 mls. pentane to make it more workable. The hydrocarbon layer is decanted and is then washed with aqueous NaOH to remove traces of acid. The washed hydrocarbon layer is dried over $K_2CO_3$ and the pentane is then distilled therefrom. Removal of the pentane leaves 102 gms. of a viscous, colorless oil which analyzes, by mass spectrograph, as follows: All percentages herein are by weight.

| | Percent |
|---|---|
| Hepta-ethylbiphenyl | 6.9 |
| Octa-ethylbiphenyl | 12.5 |
| Nona-ethylbiphenyl | 44.5 |
| Deca-ethylebiphenyl | 18.8 |
| Other | 17.3 |
| | 100.0 |

The material identified as "other" has the structural formula $C_{30}H_{46}$, but is not further identified. It is found, by mass spectograph analysis, to contain no ethylated biphenyls.

*Example II*

The procedure is the same as in Example I except that the biphenyl is dissolved in 200 mls. pentane before charging the biphenyl to the bomb and the hydrocarbon layer subsequently obtained is not diluted with pentane. The product recovered is a colorless, viscous oil containing 85% hepta-, octa-, nona-, and deca-ethylbiphenyl. It contains no lower ethylated biphenyls.

*Example III*

The procedure is the same as in Example I except that the amount of HF is 0.107 mole and the amount of $BF_3$ is 0.0275 mole. Thus the mole ratios of HF and $BF_3$ to biphenyl are 0.43:1 and 0.11:1 respectively. Five minutes after initial ethylene addition the reaction temperature is 172° C. After 52 minutes ethylene uptake ceases at which time the reaction temperature is 75° C. The product recovered weighs 77.5 gms. and is a viscous colorless oil which analyzes as follows:

| | Percent |
|---|---|
| Penta-ethylbiphenyl | 40.0 |
| Hexa-ethylbiphenyl | 55.0 |
| Other | 5.0 |
| | 100.0 |

Analysis of the 5% "other" materials shows that it contains no ethylated biphenyls.

*Example IV*

The procedure is the same as in Example III except that the biphenyl starting material is dissolved in 200 ml. pentane before being charged to the bomb. Further, the hydrocarbon layer subsequently obtained is not diluted with pentane. The product recovered is analyzed by mass spectrograph and found to contain diethylbiphenyl, triethylbiphenyl, tetraethylbiphenyl, and pentaethylbiphenyl. The total quantity of polyethylbiphenyl is 50%.

The invention claimed is:
1. Method which comprises (1) contacting biphenyl with ethylene in the absence of a solvent and in the presence of HF and BF$_3$ as catalyst, the amount of HF being in the range of 0.05 to 1.0 mole per mole of biphenyl and the amount of BF$_3$ being in the range of 0.01 to 0.25 mole per mole of biphenyl, said contacting being at an ethylene pressure of at least 200 p.s.i.g. and at a temperature sufficient to initiate an exothermic reaction but less than 100° C., (2) continuing said contact after said exothermic reaction begins until consumption of ethylene ceases, whereby there is obtained a reaction product containing polyethylbiphenyl having 5–6 ethyl groups and which is free of other ethylated biphenyls, and (3) recovering from said reaction product polyethylbiphenyl containing 5–6 ethyl groups.

2. Method according to claim 1 wherein the temperature is 20°–50° C.

3. Method according to claim 1 wherein the amount of HF is in the range of 0.1–0.8 mole per mole of biphenyl and the amount of BF$_3$ is in the range of 0.05–0.2 mole per mole of biphenyl.

4. Method according to claim 3 wherein the ethylene pressure is at least 350 p.s.i.g 5. Method according to claim 1 wherein the ethylene pressure is at least 350 p.s.i.g 6. Method which comprises (1) contacting biphenyl with ethylene in the presence of HF and BF$_3$ as catalyst, the amounts of HF and BF$_3$ being at least 0.5 mole of each per mole of biphenyl, said contacting being at an ethylene pressure of at least 200 p.s.i.g and at a temperature sufficient to initiate an exothermic reaction but less than 100° C., (2) continuing said contacting after said exothermic reaction begins until consumption of ethylene ceases, whereby there is obtained a reaction product containing polyethylbiphenyl having 7–10 ethyl groups and which is free of other ethylated biphenyls, and (3) recovering from said reaction product polyethylbiphenyl containing 7–10 ethyl groups.

7. Method according to claim 6 wherein the temperature is 20°–50° C.

8. Method according to claim 6 wherein the amounts of HF and BF$_3$ are at least 0.8 mole of each per mole of biphenyl.

9. Method according to claim 8 wherein the ethylene pressure is at least 350 p.s.i.g 10. Method according to claim 6 wherein the ethylene pressure is at least 350 p.s.i.g 11. Method according to claim 6 wherein said biphenyl is dissolved in a solvent.

References Cited by the Examiner

UNITED STATES PATENTS

| | | | |
|---|---|---|---|
| 2,172,391 | 9/1939 | Krase | 260—671 |
| 2,324,784 | 7/1943 | Lieber | 260—671 |

DELBERT E. GANTZ, *Primary Examiner.*

C. R. DAVIS, *Assistant Examiner.*